March 31, 1970   M. N. YARDNEY   3,503,464
CONTROL SYSTEM FOR A BATTERY AND HYDROCARBON POWERED VEHICLE
Filed March 4, 1968
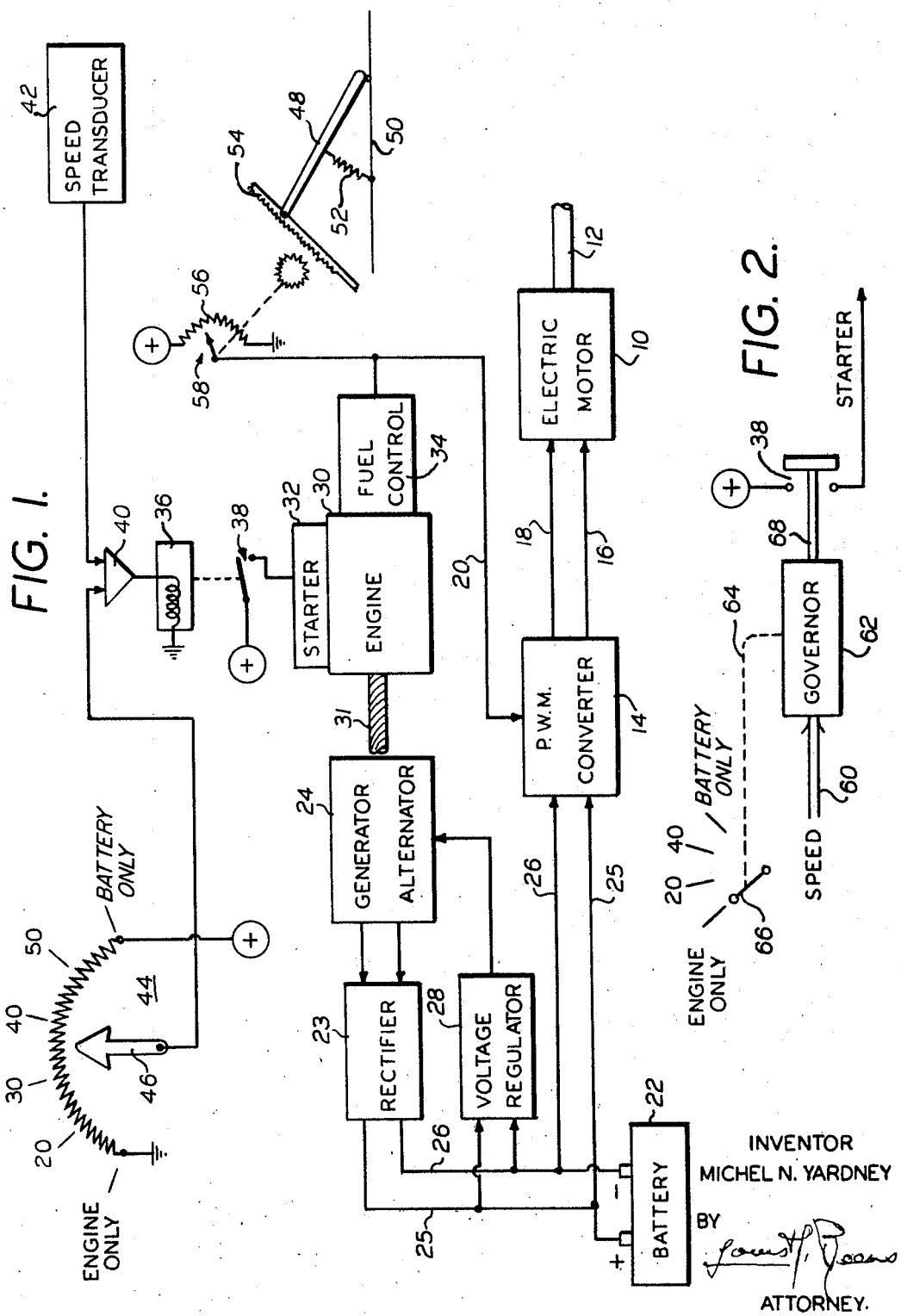
INVENTOR
MICHEL N. YARDNEY
BY
ATTORNEY.

United States Patent Office 3,503,464
Patented Mar. 31, 1970

3,503,464
CONTROL SYSTEM FOR A BATTERY AND
HYDROCARBON POWERED VEHICLE
Michel N. Yardney, 366 Central Park W.,
New York, N.Y. 10025
Filed Mar 4, 1968, Ser. No. 710,347
Int. Cl. B60k 1/00; B60l 11/12; B61c 9/38
U.S. Cl. 180—65
10 Claims

ABSTRACT OF THE DISCLOSURE

A novel control system for a hybrid-powered vehicle wherein a battery of sufficient power and an engine are combined to alternatively provide propulsion power as a function of preselected vehicle speed. Means are provided to select a vehicle speed at which the transition between engine and battery power occurs. Switch means are actuated to selectively couple the battery to an electric propulsion motor when the vehicle speed is below the selected transition speed. In a first embodiment the control system includes an electronic control. In a second embodiment a mechanical arrangement is shown wherein a governor is provided with a speed-reference lever and actuates a switch at a preselected vehicle speed. The switch in turn effectively controls the transition between battery and engine for driving the vehicle.

---

My present invention relates to an automotive vehicle of the so-called hybrid type in which the power train coupled with the traction wheels of the vehicle can be alternately driven by a source of stored electric energy or by an internal-combustion engine.

The exhaust fumes generated by the combustion of hydrocarbon fuel pollute the air and are therefore considered harmful to public health. On the other hand, conventional electric batteries available for use in automotive vehicles do not have the storage capacity for powering such vehicles on long-distance travel.

It is, therefore, the general object of my invention to provide means in such a vehicle for using battery power under conditions when pollution is to be avoided, i.e. in city traffic, and changing to engine driving on the open road where pollution is not a factor, thus conserving battery energy.

A more specific object is to provide a system adapted to ensure a smooth automatic transition from battery operation to engine operation and vice versa.

I realize these objects, in accordance with my present invention, by using the speed of the vehicle as a criterion in controlling switching means for actuating the engine to operate the propelling train of the vehicle within a relatively high speed range, consistent with open-road traffic, and for energizing an electric motor in the propelling train by an associated electrochemical generator, inndependently of the engine, to operate that propelling train within a lower speed range consistent with city traffic.

The invention will be described in greater detail hereinafter with reference to the accompanying drawing in which:

FIG. 1 is a diagrammatic view of a system for controlling the drive of an automotive vehicle by electronic means; and FIG. 2 shows a partial modification of the system of FIG. 1, using mechanical control means.

In FIG. 1, a motor 10 is coupled to the vehicle draft shaft at 12. The electric motor 10 may be of any conventional type such as a D.C. compound-wound motor or even an A.C. induction motor, depending upon the type of application desired. We shall assume that the motor is of the D.C. type and receives a D.C. input from a pulse-width-modulator converter circuit 14. This pulse-width-modulator converter transforms the D.C. input on lines 25 and 26 to a pulse-width-modulator signal at its output on the terminals 16 and 18. The converter also has a modulating input 20 for controlling the width of the pulse produced at its output leads 16 and 18. The pulse-width-modulator converter may comprise a variable-frequency oscillator operating on a D.C. input in a well known manner to produce pulses of variable widths. The result is that for low-modulation inputs on line 20 the width of the pulse is very small and for high demands of power called for by line 20 wide output pulses are supplied to the electric motor 10. The effect of the pulses is to vary the D.C. level and thereby obtain electric motor control. It is recognized that many other electric motor controls can serve the purpose of the one shown in the drawing.

The converter 14 in turn is fed both by an electrochemical generator such as a battery 22 and a D.C. output from a generator and/or rectifier combination 23 and 24. The electric generator in this instance is an alternator producing A.C. output voltage which in turn is rectified by rectifier 23. The voltage output from the rectifier is adjusted in such a manner that it essential provides the same voltage output as the battery 22 or several volts higher. In this instance, the rectifier is directly coupled to the battery by means of the wires 25 and 26 so that the two are in effective parallel combination. A conventional voltage regulator 28 is also connected in parallel with the wires 25 and 26 so that the voltage output from the generator 24 may be maintained at the setting demanded by the voltage regulator 28.

The generator 24 is connected by shaft 31 to the engine 30 and is driven thereby when the engine is operating. Generator 24 may be a D.C. generator instead of the alternator shown.

The engine 30 may be of the reciprocating type or the rotating gas-turbine type depending upon the application required. The engine 30 is provided with an automatic starting mechanism 32 and a fuel control or actuated control 34 for controlling the amount of fuel to the engine and as a result its power and speed. The starter is controlled by a relay 36 which, when energized, opens the switch 38 and when de-energized closes the switch 38 to provide a direct D.C. power linkage from the battery (plus side) to the starter 32.

Relay 36 is in turn controlled by an analog logic amplifier 40. This amplifier has two inputs, one of them from a speed transducer 42. This transducer may be of conventional type and is coupled to a wheel of the vehicle that is indicative of the speed thereof and by suitable transformation technique provides a D.C. input voltage to the analog logic amplifier 40. The speed transducer 42 may be of the A.C. tachometer type and has its output voltage rectified, the magnitude of which thereupon becomes an indication of the speed of the vehicle. The other input to amplifier 40 is obtained from a potentiometer 44. This is provided with a wiper arm 46 and generally is mounted in a frame with a dial coupled to the wiper arm 46. The potentiometer 44 is excited by a voltage obtained from the battery as indicated by the plus terminal. Since the voltage of the battery may vary somewhat as it is used to drive the motor 10, it is desirable that the voltage applied to the potentiometer be of some constant magnitude. This voltage regulation may be simply obtained by appropriate Zener diodes having a fixed voltage drop. The amplifier 40 is given a characteristic output response which is zero volts when the output from speed transducer 42 is greater than the reference-speed voltage and large positive when the speed-transducer voltage is less than the reference voltage from wiper 46.

The dial coupled to the wiper arm 46 has some inscriptions thereon indicative of the selected speed or threshold at which selective transition from engine to battery or battery to engine operation is desired. Thus, several intermediate switch positions are provided at 20, 30, 40 and 50 miles per hour as well as extreme positions to indicate when sole engine operation or sole battery operation is desired. It is, of course, recognized that for simple operations the potentiometer 44 can be replaced with a switch having a single intermediate-voltage position indicative of a selected operating speed of, for instance, 35 miles per hour and two other positions indicative of exclusive engine or battery operations. Such variations are certainly contemplated in this invention and should be considered a part thereof.

For speed control it is desired that a mechanism be provided that at least resembles conventional vehicle-speed control. Thus, a standard foot pedal 48 attached to the floor of the vehicle 50 is provided with a compressible spring 52 which presents resistances to the foot when it is depressed and has attached at the terminal thereof a rack-and-pinion mechanism 54. Controlled by the pinion is another potentiometer 56 which has a wiper arm 58. The variable resistor 56 is excited again by a voltage derived from the battery and preferably regulated to isolate it from battery-voltage fluctuations. The wiper arm 58 is coupled to the fuel control 34 and the speed control of the pulse-width-modulator converter along line 20 to provide appropriate speed-control signals for operation of the vehicle under all conditions.

In the operation of the vehicle, assuming one starts from rest, the voltage from the speed transducer 42 will differ in such magnitude from the voltage from the wiper arm 46 that the output of amplifier 40 attains some first characteristic indicative of the fact that the vehicle speed is less than the reference speed and this first characteristic is assumed to be a positive voltage. The power from this amplifier 40 then energizes the relay 36, pulling in the switch terminal and opening the switch 38. Consequently, power is not available for the engine to start and the engine is non-operative at low speeds. At the same time that the operator depresses the pedal 48 a voltage of appropriate magnitude is delivered by the wiper arm 58 and has a magnitude proportional to the desired speed. Since the engine is not in operation, the signal into the fuel control 34 will have no effect and only the input to the pulse-width-modulated converter 14 along line 20 will control the speed of the motor. Similarly, with the engine turned off, the output from the rectifier 23 is essentially zero volts and the battery 22 provides the power for driving the electric motor 10 through the converter 14. It should be realized that the rectifier 23, although connected in parallel with the battery 22, presents a high impedance. This high impedance is obtained by the unidirectional current devices (diodes) included in the rectifier.

As the vehicle increases its speed and the voltage from transducer 42 attains the reference-speed setting, the logic amplifier 40 will switch to an output of 0 volts. Consequently, the relay 36 is de-energized and the switch 38 is permitted to close. The engine is then started by the starting mechanism 32 and since the signal from the foot pedal 48 is also applied to the fuel control 34, the engine commences to speed up and drive the generator to produce the necessary electrical voltage for driving the electric motor 10. It is realized that the signal from the potentiometer 56 is applied both to the fuel control 34 and to the converter 14 and some signal-modifying means may have to be included to adjust the control signal to the different ranges called for by these devices. As the generator 24 attains the desired output voltage, and this output voltage is rectified by rectifier 23, it will automatically override the battery and supply the necessary power by means of the parallel connection between the battery and the generator.

It should thus be realized that in cold weather, when the engine is not quickly brought up to its high-speed operation, the vehicle will not encounter speed slowdown during acceleration and transitions because the battery supplies power to the motor all the time up to the time the generator is capable of taking over the load. There is thus built in an inherent smooth transition control not readily available for other mechanisms. The advantages to passenger comfort and preservation of equipment is readily observed.

Upon deceleration, when the engine is in full control, the reverse operation is obtained. In this case, the attainment of the reference speed re-energizes the relay 36 so that the switch 38 is opened. This opening of the switch removes the electrical ignition power for the engine so that the engine is shut down. The generator thereupon immediately decreases its output voltage and the battery takes over control of the electric motor. The pulse-width-modulated converter 14, which continues to receive speed control signals, will automatically adjust the supply of power to the motor throughout deceleration.

It may be that, for certain applications, the engine should operate the vehicle under all conditions. For instance, when the battery has been discharged to such a degree that one cannot rely upon it, then the engine may be made to operate the vehicle for all speed regimes by rotating positioning the wiper arm 46 counterclockwise to one limiting position so that for all speeds of the vehicle the voltage from transducer 42 will be insufficient to close the switch 38. Similarly, when one for instance has run out of fuel for the engine, the battery may be relied upon during all speed conditions by rotating the wiper arm 46 clockwise to its other extreme position in which case the switch 38 is held open all the time.

In FIG. 2 a rotating speed member 60 activates a governor 62. The governor is provided with a speed-reference input which controls the speed at which the governor can close the switch 38 by pulling in closure arm 68. The speed reference is obtained from a lever arm 66 connected through a flexible control cable 64 to the governor 62. The governor 62 may be of the well known types incorporating in an integrated construction both the switch 38 and the regulating means.

While the preferred embodiment incorporates electrical components, it should be realized that mechanical equivalents may be substituted and still incorporate the features of the invention. Thus, a governor may be used in combination with switches to provide the first and second propulsion-selection-signal characteristics now obtained from the amplifier 40 and relay 36. In this sense, the term signal as used in the following claims should be construed to include mechanical equivalents. The term propelling train as used herein and in the claims is intended to refer to all means for coupling the engine or the motor to the wheels of the vehicle for providing propulsion thereto.

I therefore claim:

1. In combination, in a vehicle and for selectively propelling said vehicle,
    (a) an engine,
    (b) an electric motor,
    (c) an electrochemical generator connectable to said electric motor for energizing same,
    (d) a propelling train operable to drive the vehicle, and
    (e) means controllable by the speed of the vehicle for actuating the engine to operate the propelling train within a relatively high speed range of the vehicle consistent with open-road traffic and for energizing the electric motor by said electrochemical generator independently of said engine to operate the propelling train within a lower speed range consistent with city traffic.

2. The combination recited in claim 1 including an electrical generator connected to the engine, the electrochemical generator being a rechargeable battery and the electric generator having its output electrically connected to the electric motor and the rechargeable battery to power the vehicle and recharge the battery.

3. In a vehicle having an engine, an electric-powered propulsion motor, and an electrochemical generator, the improvement comprising means for sensing the speed of the vehicle and producing a signal indicative thereof, means for generating a speed reference signal indicative of a preselected vehicle speed, means responsive to the speed signal and the speed reference signal for producing a propulsion selection signal, said propulsion selection signal having a first characteristic when said vehicle speed is less than the reference speed signal and having a second characteristic when said vehicle speed is greater than the reference speed signal, means responsive to the propulsion selection signal for starting said engine and maintaining said engine running to drive the vehicle upon the occurrence and during the second characteristic of said propulsion selection signal and deactivating said engine upon the occurrence of and during the first characteristic of said propulsion selection signal, and means effectively responsive to said propulsion selection signal for effectively coupling said electric motor to said electrochremical generator to drive the vehicle during said first characteristic of said propulsion selection signal.

4. In a vehicle having an engine, an electric-powered propulsion motor for driving the vehicle, an electric generator driven by said engine and an electrochemical generator, the improvement comprising means for sensing the speed of the vehicle and producing a signal indicative thereof, means for generating a speed reference signal indicative of a preselected vehicle speed, means responsive to the speed signal and the speed reference signal for producing a propulsion selection signal, said propulsion selection signal having a first characteristic when said vehicle speed is less than the reference speed signal and having a second characteristic when said vehicle speed is greater than the reference speed signal, means responsive to the propulsion selection signal for starting said engine and maintaining said engine running upon the occurrence and during the second characteristic of said propulsion selection signal and deactivating said engine upon the occurrence of and during the first characteristic of said propulsion selection signal, and means for selectively and alternatively providing said electric motor with electric power from either said electric generator or said electrochemical generator, the last-mentioned means effectively coupling the input of the electric motor to the electric generator output during said second characteristic of the propulsion selection signal and effectively coupling the electrochemical generator to the input of the electric motor during said first characteristic of the propulsion selection signal.

5. The improvement recited in claim 4 and further comprising a control interposed between said electric motor and both said electrochemical generator and generator for controlling the speed of the motor, vehicle speed control lever means for providing a signal indicative of the desired speed of the vehicle, said control being responsive to said desired speed control signal for control of the motor speed.

6. The improvement recited in claim 5 and further comprising an engine fuel control responsive to synchronous relationship with said control to said desired speed control signal.

7. The improvement recited in claim 4 wherein said motor electric power providing means further comprises means coupled to the generator for obtaining D.C. output power therefrom, an electrical connection network interconnecting the output of the electrochemical generator the generator output and the electric motor input in effective parallel relationship, whereby a physically smooth transition between electrochemical generator powered propulsion and hydrocarbon fuel engine propulsion is obtained.

8. The improvement recited in claim 7 wherein said D.C. output power means further comprises a rectifier circuit responsive to the A.C. output from the generator.

9. The improvement recited in claim 4 wherein said speed sensing means produces an electrical speed voltage indicative of the speed of the vehicle, and where the speed-reference generating means comprises a variable voltage control producing a reference voltage commensurate with the selected vehicle speed, said variable voltage control including a first voltage level representing an engine only command control and a second voltage level representing an electric motor only command control and an intermediate voltage level indicative of a selected vehicle speed.

10. The improvement recited in claim 9 wherein said propulsion selection signal producing means comprises an analog voltage logic amplifier responsive to the speed voltage and the reference voltage, said logic amplifier providing a voltage output of a first level indicative of the first characteristic when said speed voltage is less than said reference voltage and providing a voltage output of a second level indicative of the second characteristic when said speed voltage is greater than said reference voltage.

References Cited

UNITED STATES PATENTS

| | | |
|---|---|---|
| 786,376 | 4/1905 | Nilson. |
| 1,097,954 | 5/1914 | Wadsworth _____ 290—19 |
| 1,275,201 | 8/1918 | Beach. |
| 1,790,635 | 1/1931 | Arendt _____ 290—16 X |
| 1,831,071 | 11/1931 | Jones _____ 180—65 X |
| 2,581,596 | 1/1952 | Nims _____ 180—65 |

FOREIGN PATENTS 623,986  5/1949  Great Britain.

LEO FRIAGLIA, Primary Examiner

MILTON L. SMITH, Assistant Examiner

U.S. Cl. X.R.

290—16, 17

FO-1050
(5/69)

UNITED STATES PATENT OFFICE
CERTIFICATE OF CORRECTION

Patent No. 3,503,464                    Dated   31 March 1970

Inventor(s)   Michel N. Yardney

It is certified that error appears in the above-identified patent and that said Letters Patent are hereby corrected as shown below:

In the heading, line 4, read -- 336 -- for "366".

Signed and sealed this 28th day of March 1972.

(SEAL)
Attest:

EDWARD M. FLETCHER, JR.　　　　　　　ROBERT GOTTSCHALK
Attesting Officer　　　　　　　　　　Commissioner of Patents